Patented Mar. 21, 1933

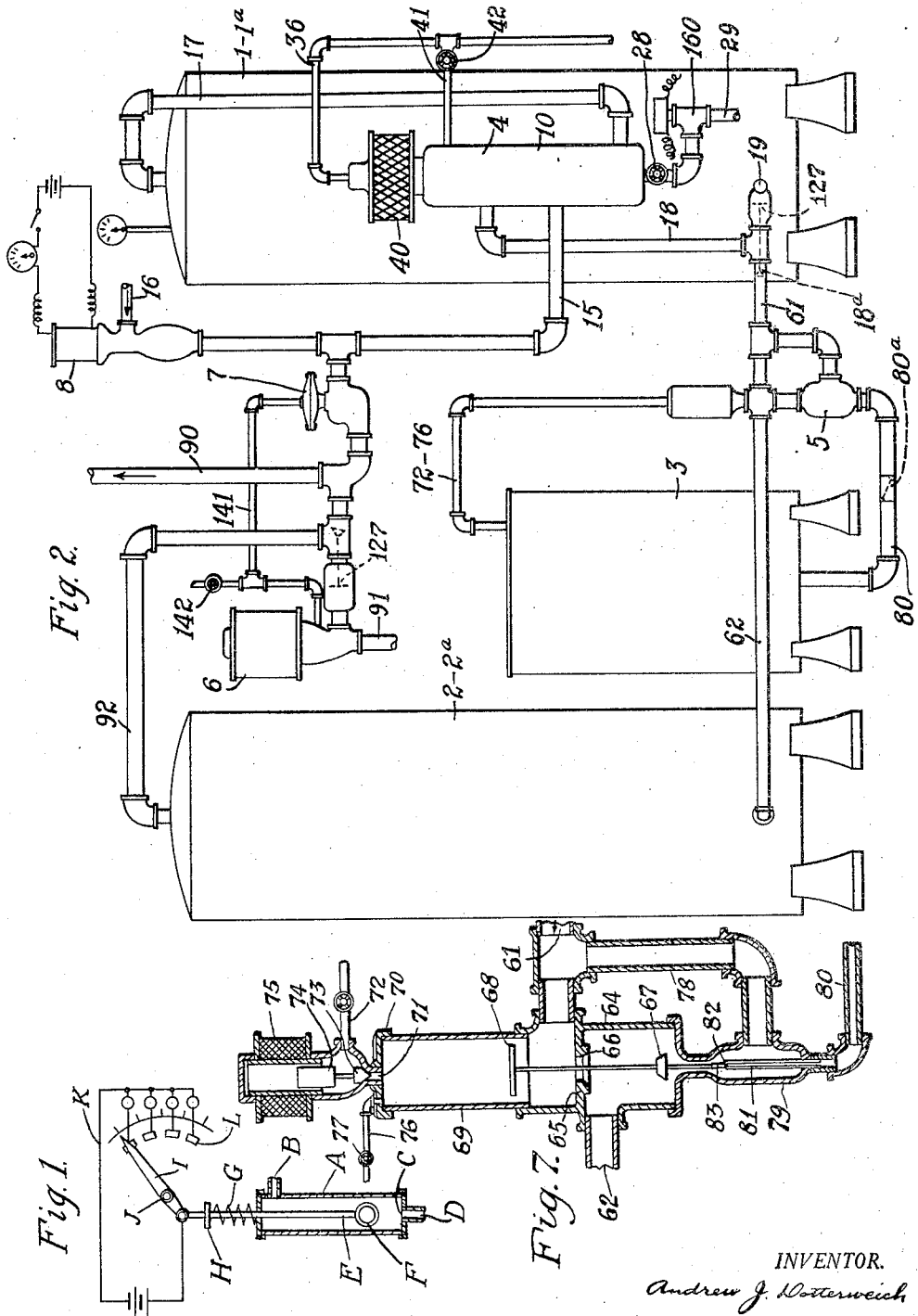

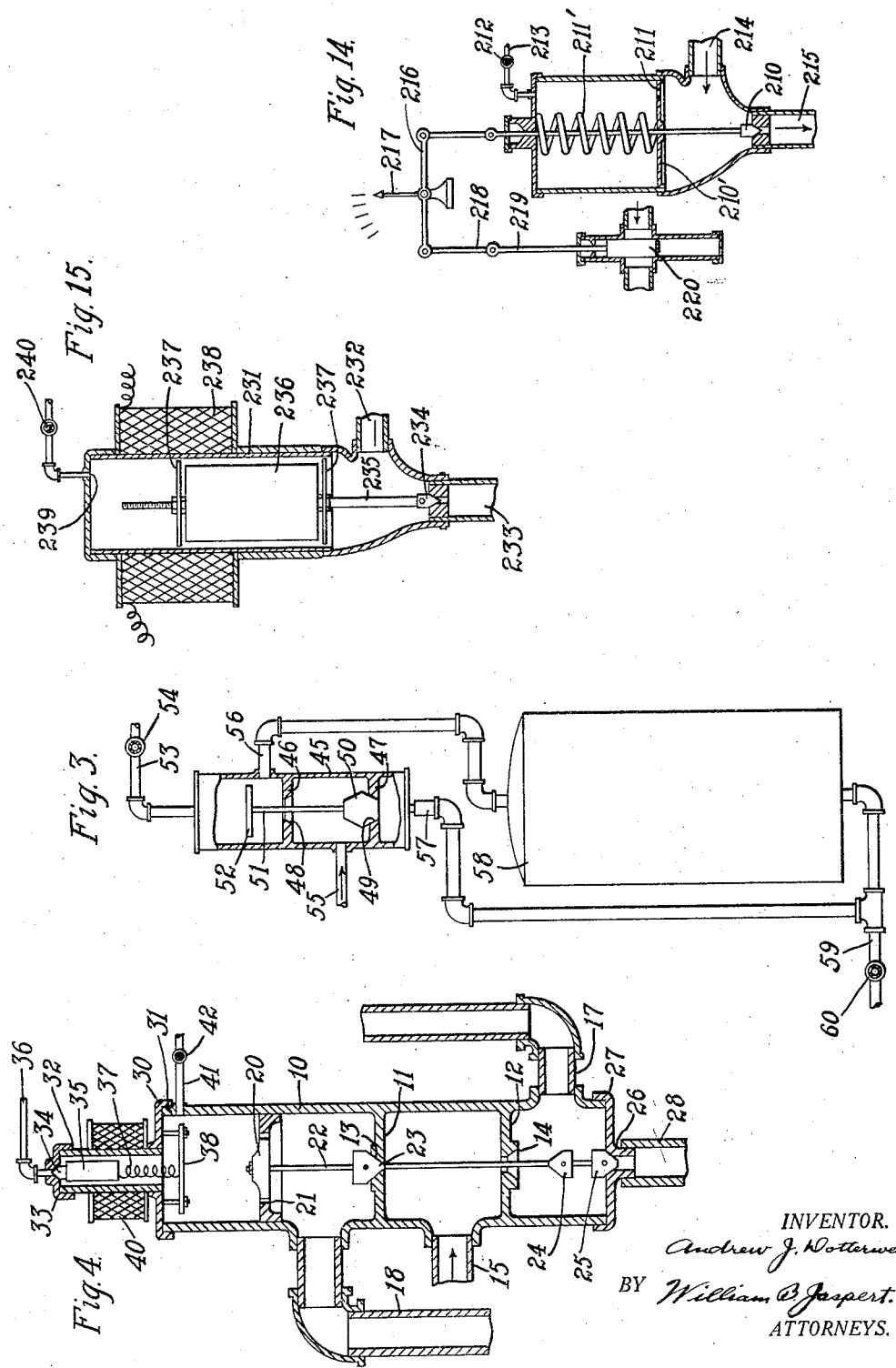

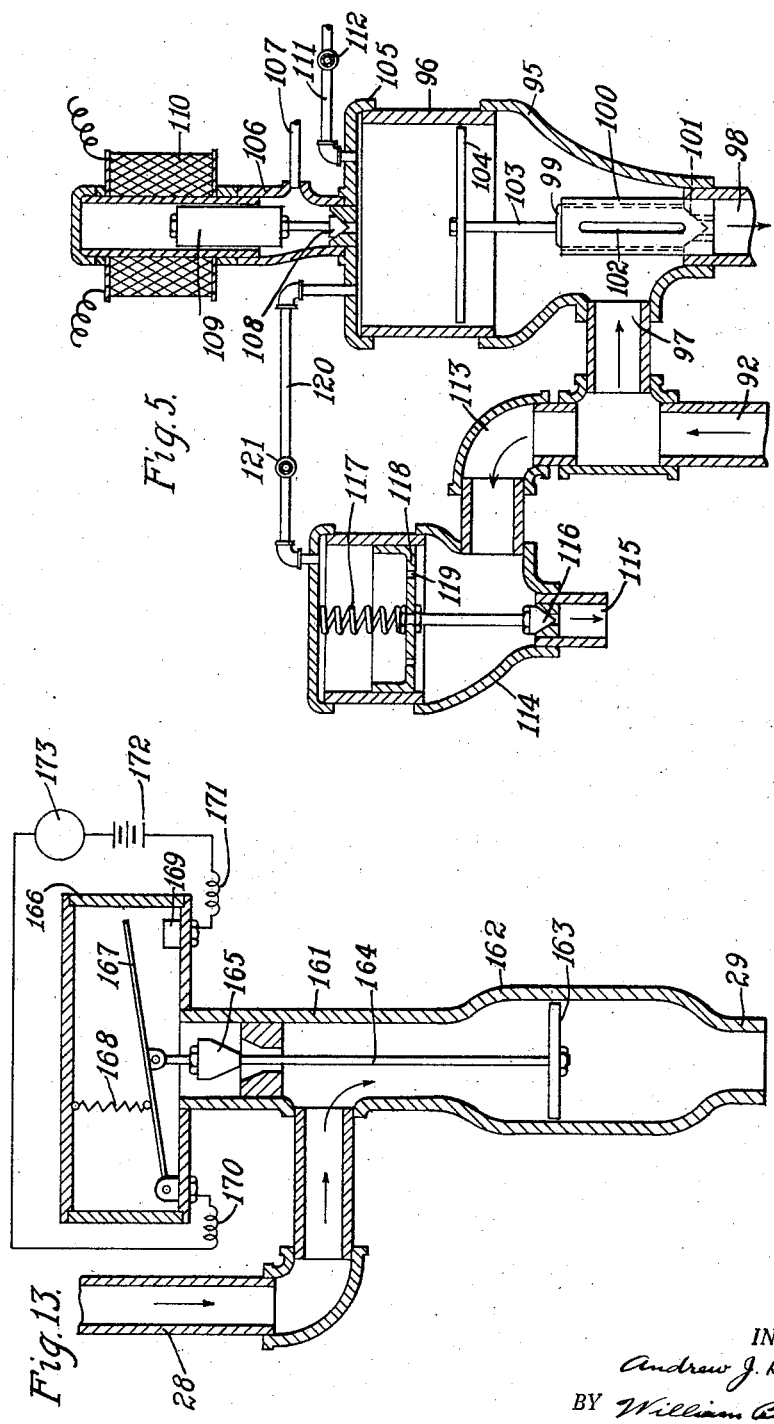

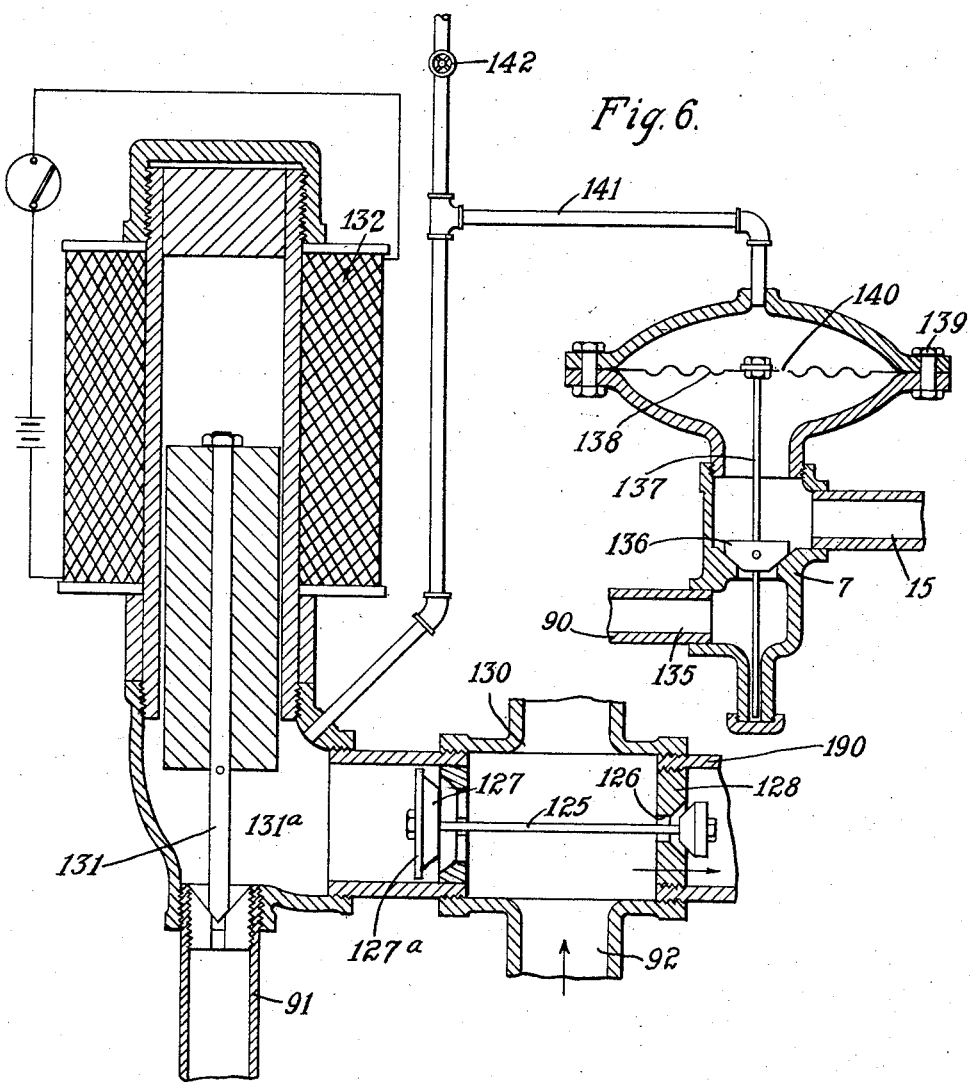

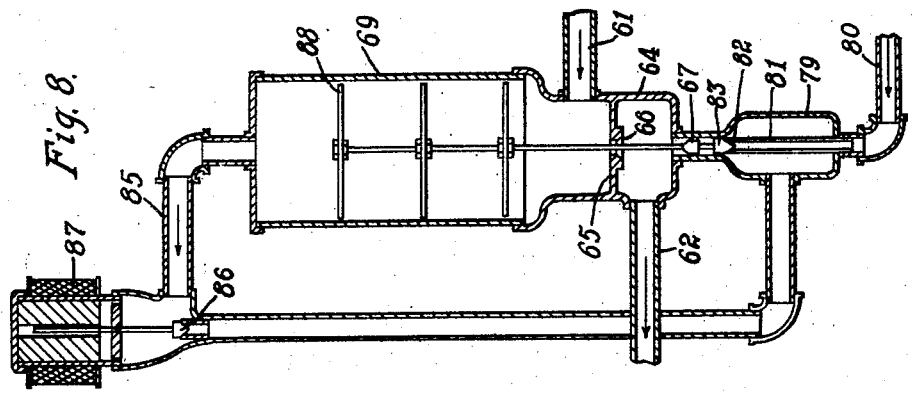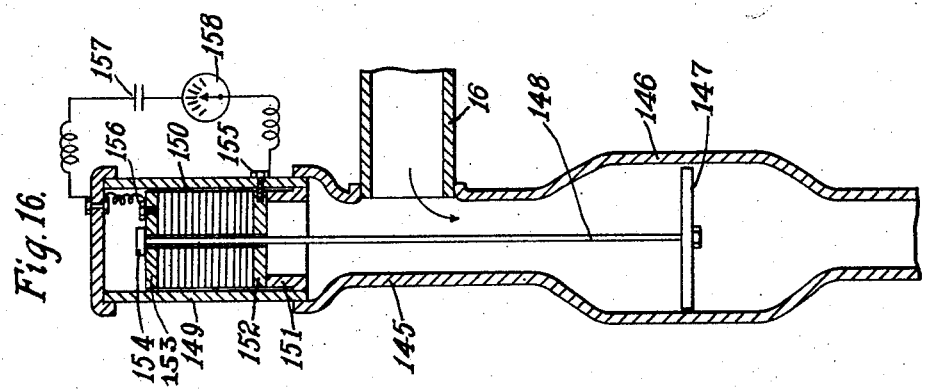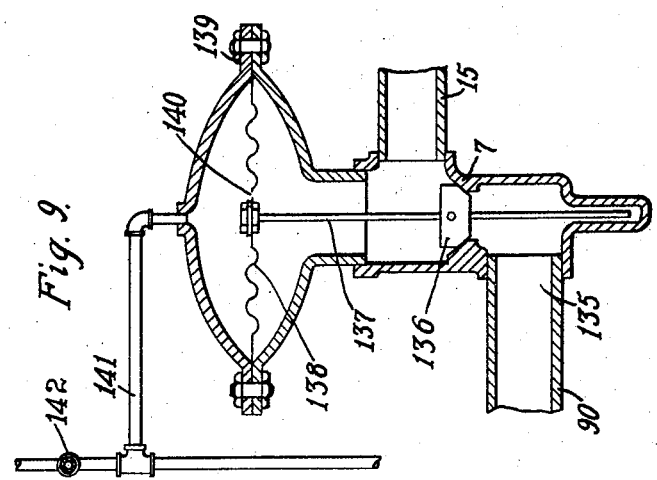

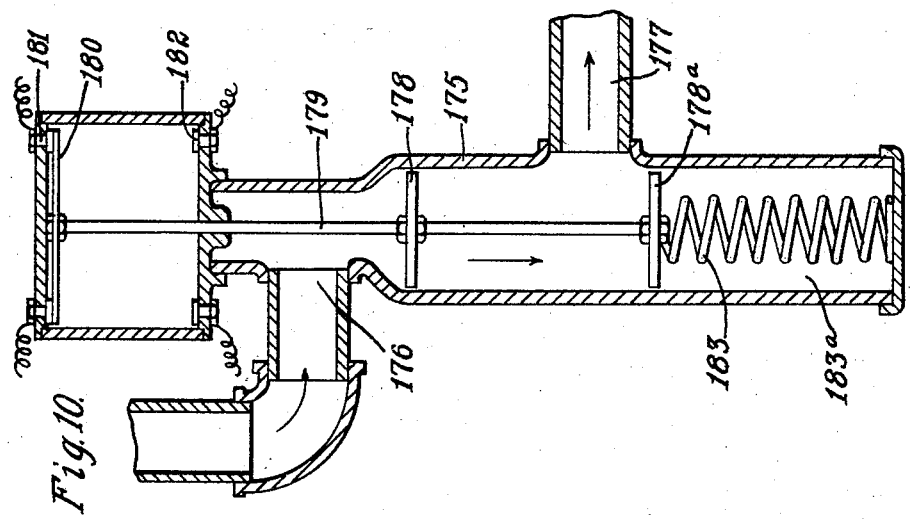
Fig.10
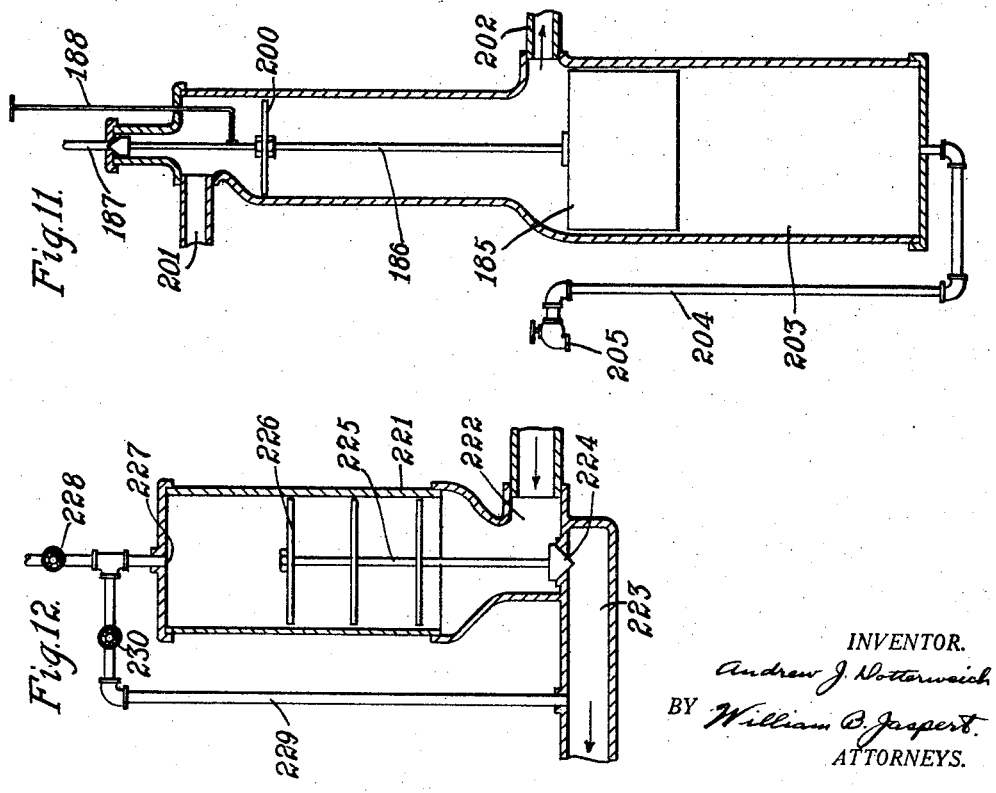
Fig.11
Fig.12
INVENTOR.
Andrew J. Dotterweich
BY William B. Jaspert
ATTORNEYS.

1,902,624

UNITED STATES PATENT OFFICE

ANDREW J. DOTTERWEICH, OF PITTSBURGH, PENNSYLVANIA, ASSIGNOR TO AUTOMATIC WATER SOFTENER COMPANY, OF PITTSBURGH, PENNSYLVANIA, A CORPORATION OF DELAWARE

VALVE MECHANISM

Application filed July 1, 1927. Serial No. 202,842.

This invention relates to valve mechanism, more particularly to valves for use in automatic water softening and filtering systems, and the present application is a continuation-in-part of an application bearing Serial Number 757,912, filed December 24, 1924, in which is disclosed a valve mechanism embodying a movable element that is actuated by flow of fluid to operate a signal device in connection with the operation of water softening and filtering systems.

The present application deals with the features of the signal actuating mechanism therein disclosed and is further directed to modifications in the structural form of the device whereby it is adapted for a variety of uses in the water softening systems referred to.

In the maintenance of water filtering and softening systems it is necessary to periodically back-wash the filter, and to regenerate the softening material, such as zeolite, by passing a salt solution therethrough, and it is very desirable to accomplish the cleansing of the filter and the regeneration of the softening medium by automatic operation.

Automatic water softening systems utilizing hydrostatic pressure for controlling the operating valves have been heretofore proposed and such systems embody special forms of valve mechanism which develop trouble due to leakage of the valves when their parts are worn, and which require frequent renewals since the normal operating pressure of the system must be maintained.

By the use of the valve actuating mechanism to be hereinafter described, the operating valves are controlled by the flow of the water in the system instead of by hydrostatic pressure and the detrimental features of the latter systems are largely overcome.

The operation of water softening systems is accomplished by flow responsive actuating devices in connection with special valve mechanism which automatically reverses the direction of flow of the system, to open the necessary drainage passages to permit the escape of the cleansing fluid and the regenerating salt in the filter and softener respectively, and to reset the valve mechanism to again reverse the flow whereby the normal operation of the system is established.

It is among the objects of this invention to provide valve mechanism which may be generally utilized where it is desired to obtain a reversal of the flow of fluid in a distributing service system and which is especially applicable for use in water softening and filtering systems for the purposes stated.

Another object of the invention is to provide valve mechanism of simple mechanical construction comprising a minimum number of parts which shall embody novel control means for initiating movement of the valve which shall be responsive in their passage controlling functions to the rate of flow of liquid passing therethrough and which shall be efficient in their operation for automatically maintaining the proper functions of the systems in which they are employed.

Another object of the invention is to provide valve mechanism of the above designated character which shall be adapted for remote control by the use of electrical operating mechanism to initiate the valve movements and which shall be provided with indicating means for operating signals or the like.

In the accompanying drawings forming a part hereof and in which like reference characters designate like parts, Fig. 1 is a diagrammatic view of a flow responsive device embodying the principles of this invention; Fig. 2 a front elevational view of a combined water filtering and softening system controlled by mechanism operating on the principles of the device shown in Fig. 1; Fig. 3 a sectional elevational view of a reversing valve employed in the system, illustrated in Fig. 2 in a manner to be hereinafter stated; Fig. 4 a sectional elevational view of a valve mechanism illustrating a modified form of the reversing valve shown in Fig. 3; Figs. 5 and 6 sectional elevational views of passage-controlling valves in which the valve mechanism is automatically operated and which embody semi-automatic means for controlling the valves; Figs. 7 and 8 sectional elevational views of valve mechanism embodying ejectors for charging the fluid with a salt or similar solution in the regeneration of the water softening device; Fig. 9 is a sectional elevational view of a valve mechanism controlled by the flow of fluid through a pressure-responsive device; Figs. 10, 11 and 12 sectional elevational views of control valve mechanism; Figs. 13 and 14 similar views of a valve mechanism embodying means for operating a signal device; Fig. 15 a similar view of a valve mechanism embodying a combination valve adapted to be operated by electro-magnetic means or by the flow of fluid against piston members embodied therein; and Fig. 16 a similar view of a flow meter.

The flow responsive device illustrated in Fig. 1 comprises a casing A having inlet and outlet passages B and C connected respectively to a source of water supply such as a water softener, and a service pipe D. Disposed within casing A and secured to the end of a stem E is a spherically shaped member F of smaller diameter than the inner diameter of the casing. Stem E projects through an opening in the top of casing A and is normally biased by a spring G which rests on the casing at one end and at its other end against a shoulder or collar H fixed to stem E. The end of stem E is shown pivotally connected to a lever I pivoted at J. Lever I constitutes a movable contact connected in an electrical circuit K and which is adapted to make contact with a plurality of stationary contacts L when subjected to angular movement. The contact arm I is actuated by movement of stem E which is responsive to the flow of water against sphere F passing through the casing. Sphere F is an impediment to the flow through the casing but being of lesser diameter permits the passage of water therethrough. The degree of movement of sphere F depends upon the rate of flow through casing A which determines the position of lever 1.

The dimensions of F are less than the inner diameter of casing A thus permitting a limited flow of water through the free space therebetween without producing movement of member F. If the flow is in excess of this amount or if the free space is changed to a smaller area there will be a force exerted on F which will cause the latter to impart movement to the control member I. Water flowing through casing A around member F will create a force on the upper part of the latter greater than on its lower portion which is principally due to friction in changing the velocity of the flow rate of the water above the member F to a much higher velocity as it passes around it. The difference of pressure on the member F effects a movement in the direction of the least pressure.

If the flow through casing A is stopped by shutting off service line D, there would be no force acting on member F since there would be a pressure balance. And if the flow through service line D were controlled the member F would be acted upon in proportion to the flow.

The flow responsive device instead of being utilized to operate a signal as in Fig. 1, may be usefully applied to control the operating valves of a water softener system as shown in connection with Fig. 2 of the drawings, and if necessarily modified in form in accordance with the different operations for which it is employed.

Referring to Fig. 2 of the drawings, the structure therein illustrated comprises a filter 1, a softener 2, a tank 3 for storing a salt solution, a reversing valve 4 for the filter, and softener respectively, an ejector valve generally designated at 5 connecting the softener 2 with tank 3, valve mechanism 6 for connecting the softener to a drain pipe, a valve 7 for by-passing the flow of water from the source of supply to the service line, a flow meter 8 and the necessary connecting pipe lines which will be hereinafter described in connection with a detailed description of the respective valve mechanisms.

The reversing valve 4 of the filter 1 is of the type illustrated in Fig. 4, and comprises a casing 10 having partitions 11 and 12 provided with valve seats 13 and 14 respectively. The casing 10 is provided with passages, one of which is connected to pipe line 15 leading to a source of water supply from a pipe line 16, Fig. 2. Another passage is connected by a pipe line 17 which enters the filter tank 1 at the top thereof as shown in Fig. 2. Another passage is connected by a line 18 to the outlet pipe 19 of the filter tank. Disposed within the valve casing 10 is a piston member 20 having ports 21 therein to balance pressure on both sides of the piston member and to permit flow of water through the casing. Piston 20 functions precisely as the spherical member F of Fig. 1, and is of the form shown to provide more positive regulation of its movement in response to the flow of water in the valve casing 10. Connected to the piston 20 is a valve stem 22 provided with valves 23, 24 and 25 in spaced apart relation which are respectively adapted to seat at 13, 14 and 26, the latter valve seat being formed in an end cap 27 which is threaded to the lower end of the casing 10 and which has a pipe connection 28 leading to a drain pipe 29 shown in Fig. 2.

The upper portion of the valve casing 10 is provided with a cover member 30 which is screwed on a threaded portion 31 of the casing and which is provided with a sleeve 32 having a cap 33 screwed on the extended end thereof which cap is provided with a seat 34 for a valve 35. A drain pipe 36 is connected to the passage controlled by the valve 35. Valve 35 is normally biased by a coil spring 37 to seat at 34. The coil spring is supported by a bracket 38 that is attached in any suitable manner to the end cap 30 of the casing 10. An electro-magnet or solenoid 40 is disposed around the sleeve 32 and connected to a suitable source of electrical energy. The solenoid when energized is adapted to withdraw valve 35 from its seat 34 against the pressure of spring 37 to open the passage leading to the drain pipe 36 and when the coil 40 it deenergized the valve 35 automatically seats by pressure of spring 37. A drain pipe 41 is connected to the upper portion of valve casing 10 and provided with a valve 42 which is adapted to be manually operated.

The valve mechanism of Fig. 4 operates in the following manner:—Water flowing from the source 16 through pipe line 15 enters the valve chamber between the partitions 11 and 12 and with the valves 35 and 42 closed, the pressure will be the same on both sides of piston 20 on account of leakage through its ports 21. When pressure on piston 20 is balanced, valves 23 and 25 are permitted to seat by action of gravity leaving the passage of the valve seat 14 open and permitting flow therethrough into the chamber below partition members 12 thence through pipe line 17 to the top of the filter tank 1 to flow down through the filtering material and out at the outlet 19. When it is desired to backwash the filter either valve 42 or valve 35 is opened or unseated to connect drain pipes 36 or 41, as the case may be, with the upper valve chamber which causes valve 23 to open by the flow of the incoming water from pipe 15 which acts with full force against piston 20 causing the valve stem to rise to close the valve passage 14 and open valves 23 and 25. Water flowing through the valve passage 13 will pass down pipe line 18 into the filter at 19 at the bottom thereof, thence it will backwash up the filter tank 1 and pass out at the top connection of the tank with the pipe line 17, thence it will pass into the lower valve chamber and out at the passage 26 leading to the drain pipe 28. During the backwash of the filter water from line 18 is prevented from passing to softener 2 by a check valve 127, Fig. 6. When the drains controlled by the valves 35 and 42 are again closed, leakage through ports 21 of piston 20 will balance pressure on the piston which permits the valves 23—25 to fall by weight of gravity and close their respective passages 13—26 whereby the flow of water is reversed and normal operation of the filter is again established.

Another form of reversing valve which may be utilized on the filter is shown in Fig. 3 and comprises a casing 45 divided by partition members 46—47 having valve seats 48—49 respectively. A valve 50 of a form which is adapted to seat in either 48 or 49 of the partition walls is disposed between the partition members and provided with a stem 51 having a piston 52 secured to the upper end thereof. The valve casing is provided with a drain pipe 53 at the top adapted to be closed by a manually operated valve 54 or an electrically operated valve of the type illustrated in Fig. 4. The casing 45 is further provided with an inlet passage connected by a pipe line 55 to the source, and outlet passages connected by pipe lines 56 and 57 to the top and bottom of a tank 58. A branch line 59 from the pipe connection 57 leads to the service connections in the water filtering system. The branch line 59 is provided with a valve 60.

The valve mechanism of Fig. 3 functions in the following manner:—With valve 54 closed, the source of fluid in line 55 flows into the valve opening 45 and since the piston member 52 of the type permitting leakage into the upper portion of the valve above piston 52, it is normally permitted to seat at 49 on the partition member 47 by action of its own weight. The flow of water from line 55 further acts on the valve 50 to keep it seated and the water flows through the passage of partition 46 and out through line 56 into the top of tank 58 thence through filtering material and branch line 59 and out. If it is desired to reverse the flow, drain passage 53 is opened by valve 54 which permits flow of water around piston 52 causing the latter to be raised by the flow from pipe line 55 whereby valve 50 seats at 48 on partition member 46 and opens the passage of partition member 47. Water will then flow out through connecting line 57 directly into tank 58 thence upwardly through filtering material and line 56 into the upper region of the valve and out through drain pipe 53. A reversing valve of the type shown in Fig. 3 embodies a single valve element which is much simpler to construct than the plurality of valves employed in the construction shown in Fig. 4 which are required to be accurately spaced.

It will be noted in the above valve mechanism that in the first instance (Fig. 4) water entering at 15 takes a divided course, the greater part being used to operate the filter and the lesser part being utilized to operate piston member together with its adhering parts whereas in the second instance (Fig. 3) all water entering casing 45 at 55 is utilized to operate both valve piston and its adhering parts together with action on the filter or softener.

In the case of a softener, quite frequently it is desired to soften in an upward direction and to salt and flush out in a downwardly direction in which case when using either of the above valves, all that is necessary to do is to have the pipe connection leading to the top of a filter connected to the bottom of a softener and likewise the pipe connection leading to the bottom of a filter connected to the top of a softener.

Again referring to Fig. 2 of the drawings, the water after passing through the filter 1 is conducted from the outlet 19 by a pipe line 61 through a valve mechanism generally designated at 127, Fig. 6, to the water softener 2 to which it is connected at its lower portion by a pipe line 62. Valve 5 is especially designated to communicate with tank 3 which contains a salt solution that is utilized in regenerating the softening material in tank 2. The form of valve 5 is illustrated in detail in Figs. 7 and 8.

Referring to Fig. 7 the valve mechanism therein illustrated comprises a casing 64 having a partition member 65 provided with a valve seat 66 which is controlled by a valve 67 having a piston 68 secured to one end thereof. The piston is adapted to operate in a cylinder formed by a sleeve 69 that is secured to or formed integral with the valve casing 64 and sealed at the top by a screw cap 70 having a passage 71 therein leading to a drain pipe 72. The passage 71 is controlled by a valve 73 having a plunger secured thereto which constitutes the movable armature of a solenoid 75 that is electrically connected to be energized for actuating the valve. An additional drain passage 76 is provided in cap 70 and is controlled by a manually operated valve 77. Discharge from drain lines 72 and 76 is preferably returned to the salt tank 3 to replace volume of salt solution withdrawn during the salting operation.

The valve casing 64 is provided with a passage leading to pipe line 61 having a branch line 78 leading to an ejector 79 which communicates with the bottom of valve casing 64. Ejector 79 is connected by a pipe line 80 to the tank 3 containing a salt solution and is further provided with a constricted nozzle 81 which projects centrally upward and which is provided with a seat 82 for a valve 83 that is integrally attached to valve 67. Another passage of valve casing 64 is connected to pipe line 62 and leads to the water softener 2.

It will be noted in Fig. 7 that the normal position of valve 67 is to be off of its seat 66 such as during the softening period, passage 71 being closed, being representative of a valve normally open and to be closed by action of the piston member 68 when drain passage 71 is opened.

The operation of the valve mechanism of Fig. 7 is as follows:—

The piston 68 being of the type which permits leakage, will permit valve 67 to respond to the flow in line 61 leading to the source such as the filter of Fig. 2 and as long as the drainage valves 73—77 remain closed, water will flow through the passage of the partition member 65 and out at line 62 to the water softener 2.

When it is desired, or necessary, to regenerate the zeolite or other softening material in tank 2, solenoid 75 is energized to raise valve 73 from its seat whereby communication is established with the upper valve chamber and the drain pipe 72. The flow of water in pipe line 61 will act against piston 68 to raise the same in cylinder 69 until valve 67 closes on its seat 66. When valve 67 is seated, the flow from line 61 will be diverted through line 78 to the ejector 79 from which it will pass around the mouth of nozzle 81 and by virtue of the restricted portion of the ejector the force of the flow will draw the salt solution out of nozzle 81 and into the lower valve chamber, thence out at line 62 into the softener 2. Valve 83 controlling passage 82 of nozzle 81 in the ejector is of course raised from its seat when valve 67 is seated which permits the suction of salt solution into the stream of water flowing through ejector 79.

When the salt solution has completed its function of regenerating the softening material, the flow of water through the valve mechanism of Fig. 7 is reversed by simply de-energizing solenoid 75 which permits valve 73 to drop by gravity on its seat, reestablishing a balanced pressure, and with both of the drain pipes 76 and 72 shut-off, valve 67 will drop from its seat and permit the flow of water from line 61 through the passage of the partition member 65 direct to line 62 without taking up any of the salt solution in the ejector.

It is of course obvious that pipe line 78 leading to the source of water supply may be connected to tank 3 containing the salt solution and that pipe 80 shown in Fig. 7 as leading to the solution may be connected to the source of water supply whereby the salt solution is directly passed into ejector 79 and drawn into the stream of water passing through nozzle 81 with the same result as explained. As shown in Fig. 2, a check valve 80a is placed in the line 80 to prevent flow of water into bottom of brine tank 3.

In Fig. 8 the valve mechanism 5 is similar to that described in connection with Fig. 7 except that the valve mechanism is modified. The piston cylinder 69, in Fig. 8, is connected by a by-pass 85 to the ejector 79. A valve 86 is provided to control the passage in the by-pass and the valve 86 in turn is actuated by a solenoid or electro-magnet 87.

The valve 67 is provided with a plurality of piston disks 88 in spaced apart relation which are smaller in diameter than the cylinder 69 to permit leakage of water therearound to normally balance pressure on both sides of the piston member.

The operation of the valve shown in Fig. 8 is as follows:—Water flowing from the source through line 61 passes through the passage of partition member 65 and out through line 62 to the water softener as long as valve 86 remains seated. If solenoid 87 is energizing, valve 86 is raised from its seat to open the passage of the by-pass 85 which permits the flow of water from line 61 through cylinder 69 and by virtue of multiple disks 88 exerts sufficient force against the piston member to seat the valve 67 and unseat valve 83. When passage 66 is closed by valve 67, water will continue to flow through cylinder 69 and by-pass 85 into ejector 79 drawing with it a salt solution from nozzle 81, and thence to pipe line 62 leading to the water softener 2. When solenoid 87 is de-energized, valve 86 seats by action of gravity and with a balanced pressure on valve 67 automatically opens to permit flow of water from line 61 through passage 66 direct to the water softener connecting line 62.

Again referring to Fig. 2 during the regeneration of the softening material in the softener 2, the salt solution passing therethrough is diverted from the service line 90 to a drain pipe 91 by the valve mechanism 6 to which it is connected by pipe line 92. Several forms of valve mechanism 6 are illustrated in detail in Figs. 5 and 6 of the drawings and are as follows:—Referring to Fig. 5, the valve mechanism comprises a casing 95 having a cylinder portion 96, an inlet passage 97, and an outlet passage 98, the latter being controlled by valve 99 that is disposed in a sleeve portion 100 which constitutes a guide for the valve. The sleeve 100 is provided with a seat 101 for the valve 99 and slotted opening 102 for the flow of water to the outlet passage 98. Valve 99 is provided with a stem 103 having a piston 104 which operates in cylinder portion 96 of the valve. A valve cover 105 is secured in screw thread engagement with the valve cylinder 96 and is provided with a sleeve portion 106 having a drain pipe 107 connected thereto. A valve 108 controlling the passage leading from the valve chamber to drain pipe 107 and valve 108 is provided with a plunger 109 that constitutes the movable armature of a solenoid 110 which is connected to a source of electric current. A drain pipe 111 communicates with the cylinder chamber and is controlled by a manually operated valve 112.

The inlet passage 97 of the valve casing 95 is connected by pipe line 92 to the top of water softening tank 2 or other source of supply and is connected by a branch line 113 to a valve casing 114 which is provided with an outlet passage 115. A valve 116 controls passage 115 of valve casing 114 and this valve is normally biased by a spring 117 to maintain it on its seat in its passage closing position. Valve 116 is further provided with a piston 118 having ports 119 therein to permit leakage of fluid into the piston chamber to balance pressure on both sides of the piston member. The piston chamber is connected by a by-pass 120 to the piston chamber of valve casing 95 and this by-pass is provided with a manually operated valve 121 to establish or cut-off communication between the respective cylinder chambers.

The operation of the valve mechanism shown in Fig. 5 is briefly as follows:— Water flowing from the softener 2 through line 92 passes through inlet passage 97 into the valve chamber of casing 95 and then through branch line 113 into the valve chamber of casing 114 and with the drain passages 107—111 and by-pass 120 closed, valves 99 and 116 will be in their closed positions, the former by its own weight since the piston 104 is of the type permitting the balance of pressure in the valve casing and on account of the natural bias of valve 116 against its seat by spring 117. By energizing solenoid 110 or by opening valve 112 drain pipe 107 or 111 is opened which causes piston 104 to raise by the force of the unbalanced pressure underneath same whereby valve 99 is raised from its seat and outlet passage 98 is opened which permits the flow of water from line 92 through 98. As long as valve 121 of by-pass 120 remains closed, the operation of valve 99 does not affect passage 116 whether the former is in its passage closing or opening position. When valve 121 is opened, the cylinder chamber of valve 116 is drained through by-pass 120 which permits piston 118 to raise thereby unseating valve 116 and causing flow through the outlet passage 115. From this it will be seen that the water flowing through line 92 may be diverted into either valve chamber and pass through their respective outlets simultaneously or valve 99 may be operated to control passage 98 independently of valve 116.

On account of slotted openings 102 in guide sleeve 100 the flow through passage 98 may be regulated by controlling the position of valve 99 since the latter controls the opening in slots 102 as well as the valve passage 98. As previously explained, piston 104 is of the type which is actuated by the flow through the valve casing and since the rate of flow is dependent upon the size of the drain passage, the position of valve 99 with respect to slots 102 may be regulated by valve 112 of drain pipe 111 thereby controlling the rate of flow through passage 98.

In the form of mechanism shown in Fig. 6, water from the softener enters at 92 flowing towards passage 126 with drain valve 131 open, water will also tend to flow towards drain 91 and in so doing comes in contact with obstruction or piston member 127A. Due to the much larger area of piston 127A as in comparison to the exposed area at 126, the water in flowing to 91 acts on piston 127A which through its adhereing parts causes passage 126 to be closed.

During the period of softening, it would be possible for hard water to pass through the opening 140, Fig. 9, through passage 141, Fig. 2, into chamber 131a, and thence to soft water outlet 126, were it not for the check valve 127 preventing such a reverse flow of hard water into the soft water line. With the opening of 126, this check valve is closed and held closed as water flows through 126 and further due to there being a slightly higher water pressure on the inlet line as in comparison to the pressure on the soft water line as caused by friction losses, there will be a difference in pressure greater in 131a to further hold check valve 127A to its seat.

Incidentally, where no by-passing arrangement is used, check valve 127 is not needed and some other suitable means can be used as a stop to prevent 127A from going too far to the right during softening periods.

Referring to Fig. 2 the flow of water coming from the water softener 2 is diverted by the double acting valve 125 from the service line to the drain pipe when the salt and flush up operation takes place, or in other words, when the softening material is regenerating in which case the passage leading to the service line is closed and the salt water is drained off through line 91.

Again referring to Fig. 2, it is sometimes desired to draw water at the service line 90 during the back wash of the filter or during the regeneration of the softener and this is accomplished by use of a valve generally designated at 7 which is illustrated in detail in Fig. 9 of the drawings.

As shown in Fig. 9 valve 7 is connected to pipe line 15 leading to the source of water and is provided with an outlet passage 135 leading to service line 90. The valve passage is controlled by a valve 136 which is connected by a valve stem 137 to the diaphragm 138 of a well known type commonly employed in pressure responsive devices. The upper portion of the casing of valve 7 is a two piece member adapted to be joined by bolts 139 which rigidly secure the diaphragm 138 therebetween. The diaphragm 138 is provided with an orifice 140 to permit the flow of fluid above the diaphragm and through a drain pipe 141 which is controlled by a manually operated valve 142 or with 142 open by valve 131, Fig. 6, and against back flow of hard water into softener by valve 127.

The function of the valve mechanism 7 is such that when the drain pipe 141 is shut off, water coming from the supply line 15 flows against the diaphragm 138 and on account of the orifice 140 therein, is permitted to flow into the chamber with which drain pipe 141 communicates, thus balancing pressure on both sides of the diaphragm. As long as the pressure on the diaphragm is balanced valve 136 remains closed by tension of diaphragm, but when drain pipe 141 is opened, water will flow out of the drain pipe which causes an unbalanced pressure to exist against the diaphragm whereby valve 136 is raised from its seat to open passage 135 which permits the flow of water direct from supply line 15 to service line 90, and drain pipe 141 may be connected to the valve 6 to drain into the pipe 91 thereof, as shown in Fig. 2.

When the regenerating process has been completed in the water softener 2, all that is necessary to cut off the supply of water running through service line 90 from source 16 is to close drain pipe 141 which automatically closes valve 136, re-establishing a balanced pressure through 140 above and below the diaphragm 138 with the result that the only possible flow of water through the service line 90 will be from the pipe line 92 leading from the water softener tank 2.

It is sometimes desirable to ascertain the rate of flow of water through the water softener and filtering system and this can be accomplished by connecting a flow meter 8 to water supply line 16 as is shown in Fig. 2. One suitable form of flow meter is shown in Fig. 16 and consists of a casing 145 connected at one end side to the pipe 16 leading to the source of water supply and having an enlarged body portion 146 for receiving a piston or baffle plate 147 that is secured to the end of a rod 148 which projects into a cylinder 149. The latter is adapted to receive a plurality of carbon disks 150 which are arranged in super-posed relation and supported on an annular shoulder 151 by an electric conductor 152. One conductor member 153 is placed on top of the carbon disks 150 and the rod 148 is provided with an enlarged head or end 154 which is adapted to intimately engage the conductor 153. The conductors 152—153 are provided with terminal screws 155—156 respectively which are electrically connected by conductors to a source of electrical energy such as a battery 157 and an electrical measuring instrument 158 which is preferably calibrated to read the flow of fluid through the meter in gallons per minute.

The rate of flow indicated on the measuring instrument 158 is reponsive to the variation of the resistance in the circuit in which it is connected and which is variable in accordance with the pressure on the carbon pile or disks 150 since the more intimately the disks 150 are in contact, the lower will be their resistance to the passage of an electric current therethrough. The relative proportion of the piston or baffle plate 147 and the expanded portion 146 of the flow meter casing is such as to permit the free flow of water therebetween, but it is obvious that the force or rate of flow exerted against the disk 147 will vary the pressure or force acting on the carbon disks 150 whereby the resistance of the pile is varied and corresponding variations of the reading on the electric measuring instrument 158 is obtained.

Again referring to Fig. 2 of the drawings, it is sometimes desirable to provide indicating or signaling means which indicate to the operator that a certain operation, such as the back washing of the filter, is under way and this is accomplished by what may be termed a signal valve 160 which is connected to the reversing valve 4 of the filter mechanism and provided with a drain pipe 29, the purpose of such valve being to indicate in a visible way at some distant point when the back wash or reverse water flow through the filter is passing out at the drain pipe 29. This signal valve is similar to that shown in Fig. 1.

Referring to Fig. 13 the valve mechanism therein illustrated is similar in function to the flow meter disclosed in Fig. 16 and comprises a casing 161 having an enlarged body portion 162 adapted to receive a piston or disk 163 which is secured at the end of a stem 164 which controls a valve 165. One end of casing 161 is provided with a passage connected to pipe line 28 leading from reversing valve 4 and a passage leading from its expanded portion 162 to drain 29, as shown in Fig. 2. The casing 161 at its upper portion is provided with a suitable housing 166 in which is pivotally mounted a switch arm 167 that is normally biased by spring 168 to raise the valve 165 from its seat and to be out of contact with the stationary contact member 169. Switch arm 167 and contact 169 are connected by terminals 170—171 respectively to an electric signaling circuit employing a source of electric energy such as battery 172 and an electric signaling device 173. In its operation the signal valve functions so that when water flows through pipe line 28 it will upon striking the disk 163, pull down valve 165 to prevent water flowing into housing 166 and simultaneously close switch arm 167 to establish the circuit in which the signal device 173 becomes energized. When the water is flowing to the drain the flow is discontinued through pipe line 28, switch arm 167 will be raised from the contact 169 by the spring 168 to break the signal circuit and open valve 165.

If it is desired to obtain automatic control of the valve mechanism or if it is desired to energize signal or electric control circuits, a valve of the type shown in Figs. 10 and 11 may be employed which functions as a slow acting switch or other actuating mechanism. As shown in Fig. 10, valve casing 175 is provided with passages 176 and 177 constituting inlet and outlet passages respectively having a plurality of piston members 178—178a disposed therebetween which are secured to a rod 179 which carries a movable contact member 180 at its upper end. The movable contact 180 is adapted to engage a pair of terminals 181 and 182 in spaced apart relation which terminals may be connected in an electric circuit for any purpose, as for example, to energize the solenoids disclosed in connection with the foregoing figures to automatically actuate the passage controlling valves of the drain pipe in the reversing valve 4 or in the valve mechanism 5 and 6, or the terminals may be connected in a signal circuit to indicate that a certain operation has been initiated or completed. The pistons 178—178a are in spaced apart relation and biased by a coil spring 183 of just sufficient strength to make contact between 180 and 181. When in normal position, the contactor 180 makes contact with terminals 181 and maintains an electric circuit in which they are connected, but when the flow starts through the passage 176, piston 178 will be disposed downwardly slowly against the resistance of coil spring 183 and dash pot piston 178a causing movable contactor 180 to engage terminals 182 whereby the circuit of terminals 181 is broken and a circuit established in which the terminals 182 are connected. When flow stops, spring 183 returns valves and switch to normal up position.

Another actuating valve mechanism is shown in Fig. 11 in which a float 185 is secured to a valve stem 186 which opens a drain pipe 187 and simultaneously actuates a link 188 that may be employed in mechanically operating a switch or valve which controls some valve mechanism in the water softening system.

In instances where valve, Fig. 11, is used in the drain line of a water softener, advantage is taken of the specific gravity of a brine solution to retard the downward action of piston 200. Briney water enters 201 tending to force downwardly piston 200 in passing around it in its passage to the drain line 202. Incidentally, chamber 203 is at all times filled with a liquid, being kept so filled by fluid which does not pass out through 202.

Drain line 204 and valve 205 permit draining chamber 203 so that as brine water ceases to flow from softener and softened water flows instead, chamber 203 can be cleared but not drained out through valve 205.

As long as brine solution is in 203, float 185 will not come down, but when chamber 203 has soft water, force against piston will force float 185 to the bottom of chamber 203. When water stops at 201, float 185 will come up together with piston 200, close valve 187 and operate any suitable control mechanism on link 188.

In Fig. 14 I have shown a modified form of control valve 210 which is provided with a piston 210' having an orifice 211 to permit leakage. The piston is biased by a coil spring 211 to rest against its seat but when the valve 212 of drain pipe 213 is opened, it will rise from its seat and permit flow of water from a line 214 to an outlet passage 215 and simultaneously actuate a lever 216 that operates the control arm 217 of an electric rheostat or the like. One end of the lever is connected by a link 218 to a valve stem 219 of a passage controlling valve 220 which is disposed in a pipe line to control the flow of water therein if desired.

In Fig. 12 is illustrated another type of flow responsive valve which comprises a cylindrical casing 221 having inlet and outlet passages 222 and 223 respectively, controlled by a valve 224. Valve 224 is provided with a stem 225 having multiple piston disks 226 secured thereto in spaced relation. The top of valve casing 221 is provided with a passage 227 controlled by a valve 228. A by-pass 229 connects passage 227 to the outlet passage 223 and is controlled by valve 230.

In operation, so long as valves 228 are closed, pressure is balanced in valve casing 221 and valve 224 remains seated by its own weight. If valve 228 is opened, the flow through drain 227 will lift piston 224 and open passage to outlet 223. If it is desired to maintain valve 224 in its raised position for any length of time, valve 230 is opened and valve 228 closed whereby water flowing through drain 227 is by-passed through 229 to outlet 223. The valve 224 may be open indefinitely without waste of water by by-passing the same as explained.

In Fig. 15 is illustrated a combined form of piston and solenoid operated plunger valve, comprising a casing 231 having inlet and outlet passages 232 and 233 respectively and a passage controlling valve 234. Valve 234 is provided with a stem 235 having a plunger or movable armature 236 and a plurality of pistons 237 secured thereto. A solenoid 238 is disposed around casing 231 and is adapted when energized to actuate its armature 236 and hence the valve 234.

A drain 239 is connected to the valve casing and is controlled by a valve 240. The operation of the combination valve is as follows:—Since pistons 237 are of the type which provide for leakage, pressure in the casing 231 is balanced and valve 234 seats by its own weight. When solenoid 238 is energized, valve 234 is opened. Simultaneously if valve 240 is opened, valve 234 is raised by virtue of the flow of water against piston 237 and through drain 239. From this it will be seen that valve 234 may be controlled by solenoid 238 irrespective of whether drain 239 is open, or by valve 240 when solenoid 238 is de-energized.

From the foregoing detailed description of the various forms of valve mechanisms it will be apparent that the pressure responsive device illustrated in Fig. 1 of the drawings, may be utilized to serve a variety of purposes and especially in connection with the automatic or semi-automatic operation of water softening systems.

Reviewing the operation of the system illustrated in Fig. 2 in connection with the operation of the valve mechanism as hereinbefore described, water is conducted to filter 1 from pipe line 16 leading to the source through line 15 to reversing valve 4 and when the drain passages 36—41 of valve 4 are closed, the flow will be from valve 4 through pipe line 17 to the top of the filter and out at outlet 19 through pipe line 61 to valve 5, thence through line 62 to the bottom of the water softener 2 from which it passes at the top through pipe line 92 direct to service line 90. Thus the water is first filtered in tank 1, then softened in tank 2 and finally conducted through service line 90 to its point of use.

When the filter has been utilized for a given length of time and it is desired to back-wash the same, either valve 34, Fig. 4 is unseated by energizing solenoid 40 which may be accomplished by resistance controls, or by push button switch or the like, conveniently located remote from the filtering system, or valve 42 may be manually operated to establish communication of the drain pipe with the upper portion of the reversing valve chamber. When this connection is made, water will flow from line 15 through the upper part of the reversing valve down through line 18 into connection 19 to the bottom of the filter tank 1 and backwash through the tank and flow out at the top into pipe line 17 from which it is conducted into the lower chamber of valve 4 thence through pipe line 28 and out at drain 29 passing through the signal valve 160 which indicates that the backwashing of the filter 1 is under way.

If it is desired to regenerate the softening agent in the tank 2, valve mechanism 5 is actuated by energizing solenoid 75, Fig. 7, or solenoid 87, Fig. 8, depending upon which type of valve is employed which will cause a flow of water from line 61 coming from the filter into ejector 79 where it picks up a salt solution passing from tank 3 through pipe line 80.

The solution is then conducted through line 62 into the lower portion of the softener, thence through the softening agent and out at pipe line 92. Solenoid 132 of valve 6, Fig. 6, is then energized to shut off the valve leading to service pipe 90 and open the valve leading from pipe line 92 to drain pipe 91 to permit the salt solution to drain out of the system. During the regeneration of the softening material in the manner explained, service may be maintained in line 90 by operation of valve mechanism 7 whereby water is by-passed from supply line 16 direct to service line 90 without passing through either the filter or softening devices.

It is evident from the foregoing description of this invention that the valve mechanism disclosed therein provides simple and efficient means of control for automatically operating a water softening and filtering system and that various modifications may be made in the details of construction without departing from the principles herein set forth, as for example the valves described as seated by action of gravity or by their own weight, may be biased by spring elements without varying their function as herein described.

I claim:

1. In a flow control system, a valve chamber having divergent outlet passages and having a common inlet passage, a single valve controlling the flow through said divergent outlet passages, a leaky piston connected to said valve, means independent of said valve for causing flow through said inlet passage around said leaky piston to close one of said outlet passages and said valve being responsive to the flow from said inlet passage against said valve for causing the flow to the other said outlet passages.

2. In a flow control system, a valve chamber having divergent outlet passages and having a common inlet passage, valve means controlling said outlet passages, a leaky piston operatively connected to said valve means, and means for directing the flow against said piston to actuate said valve means in one of its flow controlling movements, said last named means when rendered inoperative causing said valve means to be actuated by the flow against said valve for the other of its flow controlling movements.

3. In a flow control system, a valve chamber having divergent outlet passages and having a common inlet passage, valve means controlling said outlet passages, a leaky piston operatively connected to said valve means, and a relief valve which when opened causes flow from said inlet passage against said leaky piston to cause flow from the inlet passage through one of said outlet passages and when closed causes flow from said inlet passage through the other of said outlet passages.

In testimony whereof, I have hereunto set my hand.

ANDREW J. DOTTERWEICH.